Patented Feb. 18, 1947

2,416,057

UNITED STATES PATENT OFFICE 2,416,057

PROCESS FOR THE PREPARATION OF ETHYLENEUREA

Alfred T. Larson and Donald J. Loder, Wilmington, Del., assignors to E. I. du Pont de Nemours & Company, Wilmington, Del., a corporation of Delaware No Drawing. Application March 1, 1944,
Serial No. 524,522

13 Claims. (Cl. 260—309)

This invention relates to a process for the preparation of N.N'ethyleneurea, and more particularly to its preparation from ethylene glycol and urea.

N.N'ethyleneurea, hereinafter referred to as ethyleneurea, and otherwise known as 2 oxo imidazolidin and imidazolidon (2), has been made by heating ethylene diamine with diethyl carbonate at 180° C. [E. Fisher, Koch, A 232, 227 (1886)], by warming an aqueous solution of N.N'-ethylenethiourea with freshly precipitated mercuric oxide [Klut Ar. 240, 677 (1887)], and by distillation of aqueous N.N'ethylene guanidine under diminished pressure [Pierron A 9 (11) 363 (1908)].

An object of the present invention is to provide an improved process for the preparation of ethyleneurea. Another object is to provide a process for the preparation of ethyleneurea from ethylene glycol and urea. Yet another object is to provide improved procedural details and reaction conditions for the preparation of ethyleneurea from ethylene glycol and urea. A still further object is to provide a process for the preparation of ethyleneurea from ethylene glycol and urea, which is conducted under pressures in excess of atmospheric. Other objects and advantages of the invention will hereinafter appear.

The above objects are realized in accord with the process of the invention, by the reaction of ethylene glycol with urea under superatmospheric pressures. In accord with the broader aspects of the invention, urea may be dissolved in ethylene glycol, and the resulting solution introduced into a closed autoclave, wherein the solution is heated, the pressure developed autogenously, and the reaction conducted under batchwise conditions. Alternatively, the solution may be passed continuously into one end of a heated reaction zone of relatively great length to diameter, the reaction being conducted therein under pressure and the products thereof continuously being withdrawn from the opposite end of the reaction zone.

The batch or continuous process may be conducted with addition agents which may be employed, on the one hand, to further the course of the reaction, or, on the other, to decrease the decomposition of the reactants. As agents of the first class may be used catalyst such, for example, as zinc chloride, ammonium sulfate and sodium ethoxide, and as agents of the second class, ammonia and carbon dioxide may be used to minimize the decomposition, particularly of the urea.

The employment of ammonia and carbon dioxide during the reaction is of especial value, for these gases are decomposition products of the ethylene glycol-urea reaction, and if they are introduced into the reactions with the reactants and in suitable amounts, the tendency of the urea to decompose into ammonia and carbon dioxide under the elevated pressures and temperatures used is considerably suppressed. In a batch-wise process, for example, advantage may be taken of this manner of operation, inter alia, to control temperatures and/or pressure by regulating the discharge of ammonia and carbon dioxide from the converter, while continuously introducing ammonia and/or carbon dioxide. Temperature, pressure and reaction control may likewise be realized by restricting the discharge of ammonia and carbon dioxide or other volatile vapors from the reaction mixture, without introducing these gases or vapors. This method of control is especially applicable to reactions carried out under autogenous pressure. Control of pressures is likewise facilitated under the continuous or batch type process by utilizing the ammonia, carbon dioxide or other vapors injected into the reaction as the means of superimposing the desired pressure on the reaction. By injecting these gases and especially ammonia and carbon dioxide in amounts sufficient to give pressures above the vapor pressure of the corresponding gases from the solution, decomposition is inhibited. In accord with the superimposed pressure method, it is possible to operate under a lower temperature than is possible when the process is conducted under autogenous pressure conditions.

The process may be conducted under pressures above atmospheric, and more particularly between 3 and 1500 atmospheres, although higher pressures may be used if desired. The reaction is conducted at temperatures between 150 and 300° C. or above. At temperatures above 300° C., however, the crude product is somewhat darkened in color, and accordingly it is found preferable to carry out the reaction at temperatures ranging between 100 and 300° C., the temperature being raised gradually to maximum temperature. For optimum results the time consumed in heating the reactants from in the proximity of 125° C. to 175° C. is in the neighborhood of from 2 to 8 hours, and from 175 to 300° C. in the neighborhood of from 2 to 6 hours, the total time of reaction is between about 1 to 24 hours. It has been found that the reaction mixture of ethylene glycol and urea should preferably be heated to a temperature of at least 200° C. prior to the termination of the reaction, irrespective of the ratio, of reactants. Furthermore, it is believed that the reaction is favored by slow heating, although with the employment of high pressure ethyleneurea is obtained in appreciable amounts even with reaction periods as low as 30 minutes.

It has been found that if a reaction mixture containing an excess of ethylene glycol, that is, in the order of 2 moles of ethylene glycol per mole of urea, is heated under reflux conditions and atmospheric pressures, the reaction being maintained at reflux temperatures for an appreciable period of time, substantially no ethyleneurea will be produced. In accord with the process of this invention, however, ethyleneurea can be produced in satisfactory amounts providing the reaction is conducted between the 2 moles of ethylene glycol per mole of urea, under pressure in excess of atmospheric, especially at temperatures above 200° C., and it is immaterial whether that pressure be externally induced or autogenous. This is true with a wide range of ratios of glycol to urea ranging from 0.2 up to 10 or more moles of glycol per mole of urea, on a molecular weight basis. If, however, the urea is present in excess, ethyleneurea can be obtained without the necessity of conducting the reaction under superatmospheric pressures, but even under these conditions and with ratios of urea to glycol ranging up to in the order of 10 moles of urea per mole of glycol on a molecular weight basis, pressure tends to increase the rate of reaction and direct the course of the reaction toward the formation of ethyleneurea rather than toward the formation of the decomposition products of the ethylene glycol and urea. With the higher ratios of urea, say, above 6 to 1 urea to glycol, it is often advantageous to employ a mutual solvent inert to the reactants, e. g., 1.4 dioxane, dimethyl ether of ethylene glycol and similarly acting solvents being suitable for this purpose.

The grade of glycol employed is not critical, although pure ethylene glycol will give most satisfactory results. The urea employed should for best results likewise be pure, although normally occurring impurities found in synthetic urea do not appear to deleteriously affect the reaction.

As has been stated, the reaction may be carried out under a wide range of glycol to urea ratios, and when conducted under the conditions described aforesaid, ethyleneurea is formed. Inasmuch as, however, urea is a solid, it is advantageous to limit the amount of urea to glycol, unless a mutual solvent is used, if the reaction is to be carried out continuously, in order that the reaction is effected in a solution that can be readily pumped. With these considerations in mind, it is advantageous to employ solutions containing at least 15% ethylene glycol by weight.

The converter in which the reaction may be carried out should be constructed to withstand superatmospheric pressures and may be lined with silver, chromium, chrome steel, or constructed of corrosion-resisting material in order to resist the corrosive action of the reactants.

The ethyleneurea may be separated from the crude reaction mixture by steam distillation, i. e., by heating up the mixture to distillation temperature while passing steam through the mixture or by vacuum distillation. Alternatively, the crude product may be subjected to crystallization, being conducted in a suitable solvent therefor.

Examples are now given illustrating preferred embodiments of the invention wherein parts are by weight unless otherwise indicated.

*Example 1.*—A pressure-resisting silver-lined shaker tube was charged with 2 moles of ethylene glycol and 1 mole of urea. The tube was closed and the reaction mixture was heated to a temperature of 160° C. The reaction mixture was gradually heated from 160 to 180° C. over a period of 3 hours, from 180° C. to 240° C. over a period of 3 hours and held at 240° C. for approximately 1 hour. The autogenous pressure developed during the reaction gave a maximum pressure of approximately 3100 lbs. per sq. in. After cooling, the reaction product was subjected to distillation for the recovery of the ethyleneurea, which was obtained in a yield of 39% of refined ethyleneurea, based on the urea charged, and a yield of 12.3% based on the ethylene glycol charged.

*Example 2.*—The process of Example 1 was repeated with a reaction mixture consisting of approximately 3 moles of ethylene glycol and 1 mole of urea. The pressure reached in this reaction, employing the same temperature cycle used in Example 1, was approximately 3000 lbs. per sq. in., and upon distillation of the reaction product, refined ethyleneurea was obtained in a yield of approximately 57%, based on the urea charged and a yield of about 22.5% based on the ethylene glycol charged.

*Example 3.*—A pressure-resisting autoclave was charged with 15 parts of urea, 16 parts of glycol and 85 parts of anhydrous ammonia. The vessel was closed, heated to a temperature of 250° C. and a pressure of 310 atmospheres developed autogenously. The time at reaction temperature was approximately 60 minutes and by steam distillation of the reaction mixture approximately a 20% yield of ethyleneurea, based on the ethylene glycol, realized.

The procedure employed in Example 3 was duplicated in carrying out the reactions described in the examples listed in the table, the sole variations being in difference in reactants, pressures, temperatures, times, etc.

*Table*

| Example numbers | 4 | 5 | 6 | 7 |
|---|---|---|---|---|
| Urea_____Parts__ | 60 | 60 | 33 | 33 |
| Glycol_____do____ | 62 | 62 | 31 | 31 |
| Ammonia_____do____ | 68 | 68 | | |
| CO$_2$_____do____ | | | 88 | 88 |
| Water_____do____ | | 1.8 | 5 | |
| Pressure_____atm__ | 405 | 410 | 380 | 385 |
| Temperature_____° C__ | 275 | 275 | 250 | 275 |
| Time_____min__ | 30 | 30 | 120 | 90 |
| Yield to refined EU (based on glycol) per cent__ | 18 | 10 | 16 | 14 |

From a consideration of the details of the reaction of ethylene glycol with urea, it will be appreciated that ratios of reactants, temperatures used, conditions employed and addition agents added may vary widely; nevertheless, if pressures above atmospheric are employed, ethyleneurea is produced and this is not necessarily true in the absence of such pressure.

We claim:

1. In a process for the preparation of ethyleneurea the step which comprises subjecting to a temperature of at least 175° C. but below the decomposition temperature of the ethyleneurea, ethylene glycol and urea to reaction under pressure above atmospheric pressure and separating ethyleneurea from the reaction mixture.

2. A process for the preparation of ethyleneurea which comprises heating ethylene glycol and urea under pressure above 3 atmospheres to a temperature above 200° C. but below the decomposition temperature of the ethyleneurea and separating ethyleneurea from the reaction mixture.

3. In a process for the preparation of ethyleneurea the step which comprises heating to a temperature of at least 175° C. but below the decomposition temperature of the ethyleneurea, a solution of urea in ethylene glycol in a closed reaction space under autogenous pressure and separating ethyleneurea from the reaction mixture.

4. A process for the preparation of ethyleneurea which comprises heating a solution of urea in ethylene glycol to a temperature above 200° C. but below the decomposition temperature of the ethyleneurea under superatmospheric pressure in a closed reaction space while venting a portion of the vapors formed and separating ethyleneurea from the reaction mixture.

5. In a process for the preparation of ethyleneurea the step which comprises heating to a temperature of at least 175° C. but below the decomposition temperature of the ethyleneurea, a solution of urea in ethylene glycol under superatmospheric pressure in a closed reaction space while venting a portion of the ammonia and carbon dioxide vapors formed and separating ethyleneurea from the reaction mixture.

6. A process for the preparation of ethyleneurea which comprises heating a solution of urea in ethylene glycol to a temperature above 200° C. but below the decomposition temperature of the ethyleneurea and maintaining the vapor pressure of ammonia over the solution above the vapor pressure of the ammonia from the solution and separating ethyleneurea from the reaction mixture.

7. In a process for the preparation of ethyleneurea the step which comprises heating to a temperature of at least 175° C. but below the decomposition temperature of the ethyleneurea, a solution of ethylene glycol in urea and maintaining the vapor pressure of carbon dioxide over the solution above the vapor pressure of the carbon dioxide from the solution and separating ethyleneurea from the reaction mixture.

8. A process for the preparation of ethyleneurea which comprises subjecting ethylene glycol and urea to reaction at a temperature above 200° C. but below the decomposition temperature of the ethyleneurea and under pressure above 3 atmospheres in the presence of added water and separating ethyleneurea from the reaction mixture.

9. A process for the preparation of ethyleneurea which comprises subjecting to a temperature of at least 175° C. but below the decomposition temperature of the ethyleneurea, ethylene glycol to a reaction with urea under superatmospheric pressure, supressing the partial pressure of the volatile decomposition products by the presence of a gas which does not deleteriously affect the course of the reaction and separating ethyleneurea from the reaction mixture.

10. A process for the preparation of ethyleneurea which comprises subjecting to a temperature of at least 175° C. but below the decomposition temperature of the ethyleneurea, ethylene glycol and urea to reaction under pressure above 3 atmospheres, in which there are present from 0.2 to 10 moles of ethylene glycol per mole of urea and separating ethyleneurea from the reaction mixture.

11. A process for the preparation of ethyleneurea which comprises subjecting ethylene glycol and urea to reaction under pressure above 3 atmospheres, and at a temperature between 150 and 300° C. and separating ethyleneurea from the reaction mixture.

12. A process for the preparation of ethyleneurea which comprises heating a mixture of from 0.2 to 10 moles of ethylene glycol per mole of urea and at a pressure of from 5 to 1500 atmospheres, during which the mixture is gradually heated to a final temperature of 250° C. over a period of from 1 to 24 hours and separating ethyleneurea from the reaction mixture.

13. A process for the preparation of ethyleneurea which comprises heating a mixture of from 0.2 to 10 moles of ethylene glycol per mole of urea and at a pressure of from 5 to 1500 atmospheres, during which the mixture is gradually heated from solution temperature to about 175° C. over a period of from about 2 to about 8 hours, and from about 175° C. to about 250° C. over a period of from about 2 to about 6 hours and separating ethyleneurea from the reaction mixture.

ALFRED T. LARSON.
DONALD J. LODER.

REFERENCES CITED

The following references are of record in the file of this patent:

UNITED STATES PATENTS

| Number | Name | Date |
| --- | --- | --- |
| 1,924,253 | Paquin | Aug. 29, 1933 |
| 1,986,067 | Paquin | Jan. 1, 1935 |
| 2,155,328 | Paquin | Apr. 18, 1939 |
| 1,902,889 | Paquin | Mar. 28, 1933 |
| 2,253,528 | Olin | Aug. 26, 1941 |